United States Patent Office 3,153,024
Patented Oct. 13, 1964

3,153,024
SHORTSTOPPING AGENTS FOR VINYL
POLYMERIZATIONS
Rutherford B. Thompson, Jr., Decatur, Ala., and Wilfred K. Wilson, Springfield, Mass., assignors, by mesne assignments, to Monsanto Company, a corporation of Delaware
No Drawing. Filed Dec. 23, 1959, Ser. No. 861,425
13 Claims. (Cl. 260—85.5)

This invention relates to improvements in the polymerization of mono-olefinically unsaturated compounds capable of undergoing addition polymerization to form high molecular weight linear polymers. More particularly the invention relates to improvements in the polymerization of acrylonitrile and mixtures of acrylonitrile with other mono-olefinically unsaturated compounds and pertains directly to new methods for controlled termination or "shortstopping" of such addition polymerization.

This application is a continuation-in-part of our co-pending application, Serial No. 689,787, filed October 4, 1957, now abandoned, and entitled "Shortstopping Agents for Vinyl Polymerization."

In the addition polymerization of mono-olefinically unsaturated compounds the composition of the resulting polymer generally undergoes constant change during its formation. In the case of mixtures of such monomers the percentage composition represented by the various monomers in the resulting copolymers undergoes change throughout the course of the polymerization reaction. Changes in the physical properties of the resulting polymers take place constantly during the reaction and the properties of the final polymer depend to a large extent on the degree of completion of the polymerization reaction. Such properties that vary constantly during the course of the polymerization include the specific viscosity of the resulting polymer, its average molecular weight, its solubility in various solvents, etc. Therefore, it is highly desirable to provide a method for the controlled termination or shortstopping of such polymerizations at any desired point. In the case of continuous polymerization systems it is particularly necessary to be able to provide for such termination or shortstopping where the polymer produced must be held in the form of slurry or emulsion in contact with unreacted monomers and catalysts for varying periods of time before separation. Thus, in an aqueous polymerization of an acrylonitrile polymer or copolymer with another monoolefinically unsaturated compound wherein the polymer produced is withdrawn from the polymerization vessel in the form of an aqueous slurry containing substantial quantities of unreacted monomers and catalysts in solution, the physical properties and composition of the polymer existing at the time of withdrawal of the slurry are considerably changed if polymerization of any of the monomers present in solution is allowed to continue beyond that point. Such continued polymerization is the inevitable result of holding the unterminated polymer in contact with monomers and catalysts for varying periods of time prior to final separation of the polymer product. It has therefore been considered highly desirable to develop means for controlled and definite termination of polymerization of mono-olefinically unsaturated compounds.

Many methods have been suggested in the past for achieving such controlled termination or shortstopping of the polymerization reaction. However, none has been fully satisfactory, particularly for use in the production of polymers to be employed in making synthetic fibers. This has been due to the severe restrictions on the introduction of color into such polymers imposed by the needs of the textile industry. Substantial halting of the polymerization process can be accomplished by cooling the reaction mixture, but the degree of cooling and the length of time required to reach the necessary low temperature renders the methods uneconomic and in many cases impossible. Thus, in the continuous polymerization process referred to above the cooling of large volumes of polymer slurry would not take place rapidly enough to prevent some additional polymerization, which is generally undesirable. Moreover, the means for separation of the polymer product often involve temperature conditions which will again induce polymerization making the cooling procedure ineffective. Intensive effort has been directed towards discovering compounds which would act as shortstopping agents for the addition polymerization reaction. Such compounds as furfural, hydroquinone, and salts of dithiocarbamic acids have been widely used for this purpose. However, these previously proposed compounds have either been found to be ineffective in completely halting the polymerization or have been found to be effective only in such concentrations as result in extreme staining or discoloration of the polymer product. Other compounds often adversely affect the properties of the polymers in other ways, such as introducing undesirable odors into the polymer. Accordingly, the principal object of the present invention is to provide an improved method for the controlled termination of the polymerization of mono-olefinically unsaturated monomeric materials. A further object is to provide for such controlled termination of polymerization without affecting the physical properties or color of the resulting polymer. A still further object is to provide a method for such controlled termination that will effectively terminate polymerization reactions for substantial periods of time. A more specific object of the invention is to provide a method for controlled termination of the polymerization of acrylonitrile and mixtures of acrylonitrile and various other mono-olefinically unsaturated monomers. Other objects will be apparent from the description hereinafter.

The above and other objects of the invention are accomplished by the method of terminating the polymerization of mono-olefinically unsaturated monomers which comprises adding to an aqueous polymerization reaction mixture comprising one or more mono-olefinically unsaturated monomers, a redox polymerization catalyst system, and polymer thereof a substance ionizable to yield oxalate ions, which has a solubility in water of more than 0.01 gram per 100 ml. at 25° C. and is colorless in aqueous solution. It has been found that an amount not less than 0.1 millimole per mole of reacted monomers in the reaction mixture is sufficient to effectively terminate the polymerization reaction.

Substances which have been found suitable as sources of the oxalate ion include oxalic acid, the alkali metal salts of oxalic acid such as sodium, potassium lithium, and the mixed sodium potassium salt, the ammonium salt of oxalic acid, the magnesium salt of oxalic acid, the acid salts of the above, such as sodium hydrogen oxalate, potassium hydrogen oxalate, potassium tetraoxalate, ammonium acid oxalate, etc. and any other substantially water soluble salts of oxalic acid which are colorless in aqueous solution, i.e. those having a solubility in water of at least 0.01 gram per 100 ml. at 25° C. All these suitable sources of the oxalate ion are effective as terminating or shortstopping agents.

It has been found that all the above oxalate shortstopping agents are admirably suited for effectively terminating the polymerization of mono-olefinic polymerizable compounds. The new oxalate shortstopping agents produce no adverse effect on any of the polymer physical properties, including color. Moreover, it has been found that the presence of an oxalate shortstopping agent produces a stabilizing or color improvement effect on polymers produced in metallic reaction vessels. Thus, those polymers, which when produced in an aluminum polymerization vessel demonstrate color characteristics inferior to the same polymer produced in the same manner in a glass vessel, can be produced with color characteristics approximately equal to those of the glass vessel-produced polymer by means of the use of the oxalate shortstopping agents described above.

In accordance with the present invention the above-defined oxalate shortstopping agents are employed to terminate the polymerization of those mono-olefinically unsaturated compounds which undergo addition polymerization to form high molecular weight linear polymers, by which is meant that a large number of monomer molecules add onto one another to form a large molecule having a predominantly linear structure. The unsaturated organic compounds which undergo such polymerizations generally contain the characteristic structure $CH_2=C=$. Examples of this class of monomers include: the aryl olefins such as styrene, the chlorostyrenes, p-methoxy styrene, alpha-methyl-styrene, vinyl naphthalene, and the like; acrylic acid and substituted acrylic acids and their esters, nitriles, and amides such as acrylic acid, methacrylic acid, methyl acrylate, ethyl acrylate, isobutyl acrylate, methyl-alpha-chloroacrylate, methyl methacrylate, ethyl methacrylate, butyl methacrylate, ethyl ethacrylate, isoamyl ethacrylate, acrylonitrile, methacrylonitrile, methacrylamide, and the like; methyl isopropenyl ketone, methyl vinyl ketone, methyl vinyl ether, vinyl ethinyl carbinols, vinylidene chloride, vinyl pyridine, vinyl acetate, vinyl chloride, vinyl furane, vinyl carbazole, fumaric acid esters, diallyl maleate, vinyl acetylene and esters, alcohols, acids, ethers, and the like of the type described.

The oxalate shortstopping agents of the present invention are of particular value in the controlled termination of the polymerization when polymerizing a mono-olefinic monomeric material comprising acrylonitrile with one or more other compounds containing the characteristic $CH_2=C=$ group which are copolymerizable therewith, such as, for example, the aryl olefins, particularly styrene, acrylic acid and substituted acrylic acids, esters, and amides, methylisopropenyl ketone, vinyl chloride, vinylidene chloride, vinyl acetate and similar compounds defined above.

The above-defined oxalate shortstopping agents are found to be effective in the controlled termination of the addition polymerization reaction occurring when the mono-olefinic polymerizable monomeric materials are subjected to any of the well known methods of polymerization, which are catalyzed by "redox" catalysts, i.e. in which a catalyst-activator system is employed containing both an oxidizing and a reducing agent and in which the the activator, or reducing agent, is other than a substance ionizable to produce oxalate ions. Thus, the polymerization of the above-defined mono-olefinic monomeric materials can be carried out in a heterogenous system such as an aqueous emulsion or dispersion wherein the monomeric material is dispersed in a suitable liquid such as water, optionally with the aid of a suitable emulsifying agent, and polymerization is effected by adding the redox polymerization catalyst and initiator and agitating until the polymer is formed. The shortstopping agents of the present invention are of particular value in the controlled termination of the polymerization reaction when the polymerization is conducted in an homogenous system as by heating the monomerica material in a suitable solvent in the presence of redox polymerization catalyst-initiator systems.

The oxalate shortstopping agents of the present invention have been found to function generally with redox polymerization catalyst systems. However, it has been found that when such systems contain oxalic acid or an oxalate as the activator the termination is not effected by the addition of further oxalate ions. The agents of the present invention have been found to be particularly effective terminators for polymerizations in which the redox catalyst system employs as a catalyst an oxygen-liberating compounds of the type generally recognized as effective in vinyl polymerizations and as an activator a water-soluble, oxidizable sulfoxy compound in which the valence of a sulfur atom does not exceed 4. In such redox systems the catalyst may, for example, comprise hydrogen peroxide, benzoyl peroxide, percarbonates, perborates, chlorates, perdisulfates, and diethyl peroxide. Likewise the activator may, for example, comprise inorganic oxidizable sulfoxy compounds, such as sulfur dioxide, sodium bisulfite, metabisulfite, sodium hydrosulfite, and sodium thiosulfate or organic oxidizable sulfur compounds, such as dialkyl sulfites, p-toluene sulfinic acids, and formamidine sulfinic acids.

The method of carrying out the present invention consists in adding the oxalate shortstopping agent to a polymerizing reaction mixture when the physical properties of the existing polymer are those desired. Thus, in the case of a batch polymerization the shortstopping agents can be added when the molecular weight of the polymer in the polymerization vessel reaches the desired value or the agents can be added at a definite time after the onset of polymerization to determine the physical properties produced after a given time interval. The oxalate shortstopping agents may be added directly to the polymerization vessel or to a subsequent holding vessel to which the reactionmixture is transferred in batch or semi-batch polymerization systems. In the case of a continuous polymerization system the oxalate shortstopping agent may be added at any point past the polymerization vessel, such as the overflow pipe leading from the polymerization vessel to the holding tank, in the holding tank itself, or in any other suitable apparatus to which the polymerization mixture is transferred. It is desirable to add the shortstopping agents as soon as the polymerization mixture has been removed from the polymerization vessel in order to insure termination of the polymerization at the time desired. In a continuous polymerization system the time of addition of the shortstopping agents is controlled by the exit rate of the polymer in the polymerization medium and this in turn is governed by the feed rates of monomers, water, and catalyst and activator solutions. The oxalate shortstopping agents may be added as dry compounds since they are soluble in the aqueous reaction mixtures. However, it is preferable to add relatively concentrated aqueous solutions of the shortstopping agents since the terminating effect is rendered practically instantaneous in this manner.

The amounts of the oxalate shortstopping agents which can be employed to effectively terminate polymerization can be any amount not less than 0.1 millimole per mole of unreacted monomers remaining in the polymerization reaction mixture. Preferably amounts from about 0.15 to about 20 millimoles per mole of unreacted monomers are employed, since within these ranges the shortstopping agents have been found to be fully effective for reasonable periods of time. If excessive holding times are required due to some operating contingencies the amounts of shortstopping agents can be increased to 50 millimoles per mole of unreacted monomers or greater to increase the time during which polymerization is effectively terminated. Greater amounts of the oxalate shortstopping agents can be employed and easily washed from the resulting polymers, but they are not usually preferred for reasons of economy.

The application of the method of the present invention is more particularly set out and described in the examples below.

EXAMPLE I

Samples of a polymerization reaction product of 94 percent acrylonitrile and 6 percent vinyl acetate polymerized in an homogenous aqueous system by means of a persulfate-sulfur dioxide catalyst-initiator system and containing approximately 11 percent solids as an aqueous slurry were treated with various shortstopping agents. The reaction mixture containing the solid copolymer also contained approximately 30 percent of the charged monomers unreacted and required effective shortstopping or immediate filtration to prevent the further formation of fine polymer particles which render the slurries very difficult to filter upon standing. Samples of each such slurry were filtered immediately and after standing at room temperature, approximately 25° C., for 90 minutes and the amounts of polymer solids determined. The results of the determinations for each of the shortstopping agents are set out in Table I below as percent polymer solids in the respective slurry samples.

Table I

| Reagent | Millimoles/ mole Unreacted Monomers | Initial Percent Polymer | Percent Polymer in 90 min. |
| --- | --- | --- | --- |
| Water only | | 11.1 | 13.2 |
| Sodium Bicarbonate (pH?) | 13.7 | 12.1 | 14.3 |
| Sodium dithiodimethylcarbamate | 1.9 | 10.8 | [1]13.0 |
| Sodium dithiomethylcarbamate | 19 | 10.8 | [1]11.1 |
| p-Methoxy phenol | 0.9 | 11.8 | 12.6 |
| Sodium Oxalate | 6.9 | 11.0 | 11.0 |
| Ammonium Oxalate | 20 | 12.9 | 13.0 |

[1] Polymer stained.

EXAMPLE II

Samples of the same polymerization reaction mixture described in Example I above containing approximately 30 percent of unreacted monomers charged were shortstopped with various amounts of sodium oxalate and oxalic acid. The control samples noted below were not shortstopped but were filtered immediately. The samples shortstopped with sodium oxalate were allowed to cool from the initial temperature of the slurry of 40° C. to approximately 25° C. and thereafter held at that temperature for a period of approximately 105 minutes before filtering while the samples shortstopped with oxalic acid were allowed to cool from 40° C. to 25° C. and held over a period of approximately 120 minutes prior to filtering. A control sample was taken and filtered immediately before and after each series of five shortstopped samples to determine the approximate amount of polymer solids present at the times of adding the shortstopping agents to each sample. The percent polymer solids for control samples in parentheses are the result of interpolation between the two controls for each series of samples. This was necessitated by the lapse of approximately three minutes between shortstopping each sample in a series and the consequent further polymerization occasioned by the time lapse. Each of the shortstopping agents were added to the slurry samples as aqueous solutions sufficient to yield the stated millimoles of agent per mole of unreacted monomers present in the slurries. The results stated as percent of polymer solids in the various samples are set out in Tables IIA and IIB below.

Table IIA
SODIUM OXALATE SHORTSTOP

| Sample | Time to Filtration, Minutes | Mmoles/ mole Unreacted Monomers | Percent Polymer | |
| --- | --- | --- | --- | --- |
| | | | Controls | Shortstopped |
| A | 0 | Control | 11.26 | |
| B | 105 | 1.50 | (11.30) | 11.31 |
| C | 105 | 0.60 | (11.35) | 11.53 |
| D | 105 | 0.45 | (11.40) | 11.51 |
| E | 105 | 0.30 | (11.45) | 11.50 |
| F | 105 | 0.15 | (11.50) | 11.52 |
| G | 0 | Control | 11.53 | |

Table IIB
OXALIC ACID SHORTSTOP

| Sample | Time to Filtration, Minutes | Mmoles/ mole Unreacted Monomers | Percent Polymer | |
| --- | --- | --- | --- | --- |
| | | | Controls | Shortstopped |
| G | 0 | Control | 11.53 | |
| H | 120 | 1.50 | (11.54) | 11.50 |
| I | 120 | 0.60 | (11.55) | 11.59 |
| J | 120 | 0.45 | (11.56) | 11.49 |
| K | 120 | 0.30 | (11.57) | 11.60 |
| L | 120 | 0.15 | (11.58) | 11.72 |
| M | 0 | Control | 11.58 | |

EXAMPLE III

A comparison of the whiteness of color of the copolymers produced from the same polymerization reaction mixture as described in Example I above when polymerized in a glass reaction vessel and in aluminum at a surface to volume of reaction mixture ratio of 0.057 cm.$^{-1}$ was made. The control slurries in glass, samples A and B, were shortstopped by means of cooling to 5° C. with ice. Samples of two slurries produced in the presence of aluminum were each shortstopped with ice to 5° C. in one case and with an aqueous solution of sodium oxalate calculated to yield 0.75 and 3.4 millimoles per mole of unreacted monomers respectively in the other case. An aqueous solution of sodium bicarbonate was also added to adjust the pH of the oxalate shortstopped slurries to approximately 6.5–7.5. Samples C and D were from the same lot of slurry as were samples E and F, and hence, are directly comparable. The results of the determination of purity and brightness by means of the chromaticity coordinates as determined from tristimulus values measured on a reflectance spectrophotometer were made for each polymer sample as initially formed after drying and after heating to a temperature of 145° C. for eight hours. Those results are set out in Table III below.

Table III

| Sample | Type of Vessel | Shortstop | Initial Polymer | | Heated Polymer | |
| --- | --- | --- | --- | --- | --- | --- |
| | | | Purity | Brightness | Purity | Brightness |
| A | Glass | Ice | 1.7 | 97.0 | 7.4 | 88.8 |
| B | do | do | 1.4 | 97.4 | 10.3 | 80.6 |
| C | Aluminum | do | 1.7 | 95.9 | 12.3 | 78.0 |
| D | do | 0.75 mm. Na$_2$C$_2$O$_4$ | 2.2 | 96.1 | 10.9 | 82.8 |
| E | do | Ice | 1.6 | 96.9 | 15.0 | 72.4 |
| F | do | 3.4 mm. Na$_2$C$_2$O$_4$ | 1.7 | 96.5 | 12.3 | 80.0 |

EXAMPLE IV

The polymerization reaction product of 94 percent acrylonitrile and 6 percent vinylidene chloride polymerized in a homogenous aqueous system by means of a persulfate-sulfur dioxide catalyst-initiator system, which was an aqueous slurry containing approximately 30 percent unreacted monomers, was shortstopped by means of an aqueous solution of sodium oxalate sufficient to yield 7.0 millimoles per mole of unreacted monomers. The slurry was also treated with sufficient sodium bicarbonate to adjust the pH of the slurry to 6.5–7.0, and the slurry filtered after a holding period of approximately twenty minutes. No difficulty was experienced in filtering the copolymer solids. No fine polymer particles were formed and the filter cloths were not coated with fine polymer. In contrast samples of the same polymerization reaction product taken before shortstopping and allowed to come to room temperature and stand over a period of two hours before filtering had developed so many fine polymer particles that the filter cloths were "blinded" rapidly and complete filtration of the samples was impossible.

EXAMPLE V

A sample of the polymerization reaction product of 94 percent acrylonitrile and 6 percent vinyl acetate polymerized in a homogenous aqueous system by means of sodium chlorate-sulfur dioxide catalyst-activator system, which was an aqueous slurry containing approximately 30 percent of the monomers charged unreacted was shortstopped with an aqueous solution of sodium oxalate sufficient to yield 14.3 millimoles of oxalate ion per mole of unreacted monomers. The shortstopped sample was then stored for 2 hours at 50° C. Another sample was filtered immediately and a third sample was filtered after storage for 2 hours at 50° C. to determine the amounts of polymer solids. The results of the determinations are set out in Table V below as percent polymer solids in the respective samples.

*Table V*

| Sample | Millimoles/mole Unreacted Monomers | Initial Percent Polymer | Percent Polymer in 2 hours |
|---|---|---|---|
| A | | 11.1 | 12.5 |
| B | 14.3 | 11.1 | 11.2 |

EXAMPLE VI

The finding that a polymerization employing a redox catalyst system with an activator ionizable to yield oxalate ions is not terminated by these oxalate shortstopping agents is illustrated below. A sample of a polymerization reaction product of 94 percent acrylonitrile and 6 percent vinyl acetate polymerized in a homogenous aqueous system by means of ceric ammonium sulfate-oxalic acid catalyst-activator system, which was an aqueous slurry containing approximately 25 percent of the monomers charged unreacted was treated with an aqueous solution of sodium oxalic sufficient to yield 32.6 millimoles of oxalate ion per mole of unreacted monomers. The treated sample was stored for 2 hours at 50° C. A sample was filtered immediately and another untreated sample was filtered after storage for 2 hours at 50° C. The results are set out in Table VI below as percent polymer solids in the respective samples.

*Table VI*

| Sample | Millimoles/mole Unreacted Monomers | Initial Percent Polymer | Percent Polymer after 2 hours |
|---|---|---|---|
| A | | 12.8 | 14.9 |
| B | 32.6 | 12.8 | 15.0 |

We claim:

1. The method of terminating the polymerization of an acrylonitrile polymerization reaction mixture which comprises adding at least 0.1 millimole per mole of unreacted monomers of a substance ionizable to yield oxalate ions which is colorless in aqueous solution and soluble in water to greater than 0.01 gram per 100 mls. at 25° C. to a polymerizing reaction mixture comprising in an aqueus medium acrylonitrile, polymer thereof, and catalyst and activator members of a redox catalyst system, the activator being other than an oxalate ion yielding substance, to immediately terminate polymerization.

2. The method of claim 1 wherein the activator member of the redox catalyst system is a water-soluble sulfoxy reducing agent which has a sulfur atom having a valence not exceeding 4.

3. The method of terminating the polymerization of an acrylonitrile polymerization reaction mixture which comprises adding at least 0.1 millimole per mole of unreacted monomers of a substance ionizable to yield oxalate ions which is colorless in aqueous solution and soluble in water to greater than 0.01 gram per 100 mls. at 25° C. to a polymerizing reaction mixture comprising in an aqueous medium acrylonitrile, at least one other monomer containing a sole $CH_2=C=$ group, polymer thereof, and catalyst and activator members of a redox catalyst system, the activator being other than an oxalate ion yielding substance, to immediately terminate polymerization.

4. The method of claim 3 wherein the substance ionizable to yield oxalate ions is potassium oxalate.

5. The method of claim 3 wherein the substance ionizable to yield oxalate ions is magnesium oxalate.

6. The method of claim 3 wherein the activator member of the redox catalyst system is a water-soluble sulfoxy reducing agent which has a sulfur atom having a valence not exceeding 4.

7. The method of claim 3 wherein the substance ionizable to yield oxalate ions is oxalic acid.

8. The method of claim 3 wherein the substance ionizable to yield oxalate ions is sodium oxalate.

9. The method of claim 3 wherein the substance ionizable to yield oxalate ions is ammonium oxalate.

10. The method of terminating the copolymerization of acrylonitrile and vinyl acetate which comprises adding at least 0.1 millimole per mole of unrecated monomers of a substance ionizable to yield oxalate ions which is colorless in aqueous solution and soluble in water to greater than 0.01 gram per 100 mls. at 25° C. to a polymerizing reaction mixture comprising in an aqueous medium acrylonitrile, vinyl acetate, polymer thereof, and catalyst and activator members of a redox catalyst system, the activator being other than an oxalate ion yielding substance, to immediately terminate polymerization.

11. The method of claim 10 wherein the activator member of the redox catalyst system is a water-soluble sulfoxy reducing agent which has a sulfur atom having a valence not exceeding 4.

12. The method of terminating the copolymerization of acrylonitrile and vinylidene chloride which comprises adding at least 0.1 millimole per mole of unreacted monomers of a substance ionizable to yield oxalate ions which is colorless in aqueous solution and soluble in water to greater than 0.01 gram per 100 mls. at 25° C. to a polymerizing reaction mixture comprising in an aqueous medium acrylonitrile, vinylidene chloride, polymer thereof, and catalyst and activator members of a redox catalyst system, the activator being other than an oxalate ion yielding substance, to immediately terminate polymerization.

13. The method of claim 12 wherein the activator member of the redox catalyst system is a water-soluble sulfoxy reducing agent which has a sulfur atom having a valence not exceeding 4.

References Cited in the file of this patent

UNITED STATES PATENTS

| 2,473,549 | Smith | June 21, 1949 |
| 2,556,651 | Howland et al. | June 12, 1951 |
| 2,656,338 | Lytton | Oct. 20, 1953 |
| 2,689,242 | Lucht | Sept. 14, 1954 |
| 2,701,242 | Erchak et al. | Feb. 1, 1955 |
| 2,739,140 | Price et al. | Mar. 20, 1956 |
| 2,812,317 | Barrett | Nov. 5, 1957 |

FOREIGN PATENTS

| 675,251 | Great Britain | July 9, 1952 |